United States Patent Office
3,189,623
Patented June 15, 1965

3,189,623
16α-BROMO- AND 16α-IODOPREGNANES AND PROCESS
Donald E. Ayer, Portage Township, Kalamazoo County, Mich., assignor to The Upjohn Company, Kalamazoo, Mich., a corporation of Delaware
No Drawing. Filed Dec. 11, 1963, Ser. No. 329,865
18 Claims. (Cl. 260—397.4)

This invention relates to novel steroid compounds and is more particularly concerned with progestationally active 16α-bromo-6α-methylpregnanes, 16α-iodo-6α-methylpregnanes and intermediates for the production thereof, as well as processes for the production thereof.

The novel products and the process of the production thereof can be illustratively represented as follows:

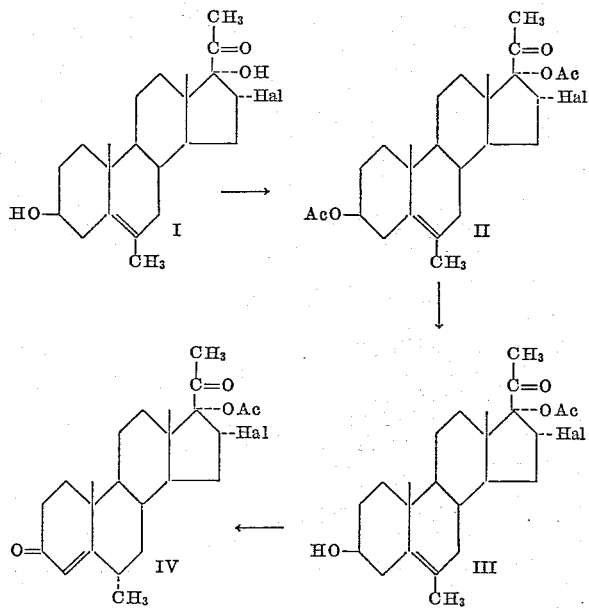

wherein Hal is a halogen atom selected from the group consisting of bromine and iodine and wherein Ac is the acyl radical of an organic carboxylic acid, particularly of a hydrocarbon carboxylic acid containing from 1 to 12 carbon atoms, inclusive.

The process of the novel invention comprises: treating a 16α-halo-3β,17α-dihydroxy-6-methyl-5-pregnen-20-one (I) with an acylating agent selected from acyl bromides, acyl chlorides, and organic carboxylic acid anhydrides wherein the acyl group of the organic carboxylic acids is defined as hereinabove, to obtain the corresponding 16α-halo-3β,17α-diacyloxy-6-methyl-5-pregnen-20-one (II); subjecting this diacylate of Formula II to selective solvolysis to obtain the corresponding 16α-halo-3β-hydroxy-6-methyl-17-acyloxy-5-pregnen-20-one (III), and oxidizing the 17-monoester to obtain the corresponding 16α-halo-6α-methyl-17α-acyloxyprogesterone (IV) (16α-halo-6α - methyl-17α-hydroxy-4-pregnene-3,20-dione 17-acylate).

The novel compounds of Formulae I, II and III are useful intermediates for the final products of Formula IV. The final products of Formula IV, particularly the 16α-bromo- and 16α-iodo-17-hydroxyprogesterone 17-acetates, are very active progestational agents which can be used both orally and parenterally. The find application in "cyclic therapy" where estrogenic and progestational hormones are supplied together or in succession so as to favor re-establishment of normal endometrium-ovary-anterior pituitary gland relationship in cases of menstrual disturbances. The compounds can further be used in the treatment of animals to produce estrus at the precise period desired, and thereby to control the period of birth of offsprings in a manner convenient and/or economical for its owner, permitting marketing outside the ordinary seasons.

The 16α-bromo- and 16α-iodo-6α-methyl-17α-hydroxyprogesterone acylates can be used in form of pills, for example mixed with lactose, glucose, flour and the like, or can be used in aqueous suspension for injectable forms of medications.

The compounds of Formula IV, moreover, can be used as intermediates in the production of useful anti-inflammatory compounds by submitting compounds of Formula IV to fermentation by 11β-hydroxylating microorganisms, for example *Cunninghamella blakesleeana*, *Curvularia lunata*, species of *Trichothecium* such as *Trichothecium roseum*, *Gongronella ureolifera*, and the like, to obtain the corresponding 11β,17α-dihydroxy-16α-bromo-(or iodo-)4-pregnene-3,20-diones which have anti-inflammatory activity (particularly topical anti-inflammatory activity) and, thus are compounds useful for ointments, lotions, salves, and the like for the treatment of inflammatory conditions of the skin. The activities of such 11β- derivatives of compound IV are considerably increased by introducing a 9α-fluoro group in the well-known manner and/or by introducing double bonds at $C_{1-2}$ or $C_{6-7}$.

Compounds of Formula IV can also be converted to their $\Delta^6$-analogs, i.e., 16α-halo-6α-methyl-17α-hydroxy-4,6-pregnadiene-3,20-dione 17-acylate by heating compounds of Formula IV, for example with chloranil. Such 16 - halo-16α-methyl-17α-hydroxy-4,6-pregnadiene-3,20-dione 17-acylates have enhanced progestational activity and can be used like the compounds of structure IV.

The starting materials of structure I, which are novel compounds, are produced as shown in the preparations 1 and 2.

In carrying out the process of the present invention the selected 16α-halo-3β,17α-dihydroxy-6-methyl-5-pregnen-20-one in which the halo group is selected from bromine and iodine, dissolved in an organic solvent such as pyridine, carbon tetrachloride, tetrahydrofuran, or the like is reacted with an anhydride of an organic acid or with the chloride or bromide of the acyl group of an organic acid, particularly a hydrocarbon carboxylic acid. Acylation agents thus employed comprise the bromides and chlorides and anhydrides of organic carboxylic acids such as acetic acid, propionic acid, butyric acid, maleic acid, hexanoic acid, heptanoic acid, octanoic acid, decanoic acid, lauric acid, β-cyclopentylpropionic acid, isobutyric acid, benzoic acid, ethylbenzoic acid, phenylacetic acid, phenylpropionic acid, and the like. If a formate is desired, formic acid is used directly. The temperature of the reaction is preferably about room temperature up to 70° C., but a range between 0° and 125° is operable. The esterification proceeds best when an acid catalyst is used, such as toluenesulfonic acid, 2,4-dinitrobenzenesulfonic acid, chlorobenzoic acid, or a very small amount of sulfuric acid. The reaction time depends on the temperature applied and will be between 15 minutes and 1 hour at high temperatures and as long as one day at low temperatures. At room temperature a period between 2 and 8 hours is sufficient. At the termination of the reaction the product is isolated and purified by conventional methods, such as evaporation of the solvents, or pouring the reaction mixture in water to obtain a precipitate, or extraction and evaporation, or crystallization and recrystallization to obtain pure products. If necessary, chromatography can be used.

The selective solvolysis in which the 3,17-diacyloxy steroid is converted to the corresponding 3-hydroxy-17-acyloxy steroid is carried out by heating an alcohol solution of the steroid diester with a strong acid catalyst. A good method is to boil the steroid with a 0.2 to 2% solution of concentrated hydrochloric, concentrated perchloric, or concentrated sulfuric acid in methanol. Other solvents useful in this reaction are alcohols, such as ethanol, propanol, isopropanol, butanol, t-butyl alcohol, and the like. At the termination of the reaction the reaction mixture may be poured into water and the water solution extracted with water-immiscible solvents such as methylene chloride, ether, benzene, ethylene chloride, or the like. From the extracts the material is recovered by conventional procedures such as evaporating the solvent, and is purified generally by crystallization and recrystallization, or, if necessary, by chromatography.

The thus-obtained 16α-halo-3β-hydroxy-6-methyl-17-acyloxy-5-pregnen-20-one is oxidized to the 16α-halo-6α-methyl-17α-acyloxyprogesterone in conventional manner, for example with chromic anhydride in acetic acid solution at room temperature, or with dichromate in acetic acid solution in the presence of small amounts of sulfuric acid, or as in the preferred embodiment of this invention, by an Oppenauer oxidation with, for example, aluminum isopropoxide, aluminum t-butoxide in a ketone such as acetone, diethyl ketone, ethyl-methyl ketone, cyclohexanone, cycloheptanone, or the like. This oxidation is generally carried out at the reflux temperature of the reaction mixture during a period of 15 minutes to 2 hours. The reaction may also be carried out at room temperature up to temperatures of 100° or more, depending on the solvent with corresponding adjustments of the period of time for the reaction. At the end of the reaction the material is isolated and purified by conventional methods such as extraction, evaporation of the organic layers, chromatography, crystallization and recrystallization, making use of solvents such as methylene chloride, ethylene chloride, methanol, ethanol, Skellysolve B hexanes, acetone, ethyl acetate, benzene, or the like.

Further details of these reactions are found in the subsequent examples.

PREPARATION 1

*16α-bromo-3β,17α-dihydroxy-6-methyl-5-pregnen-20-one*

A suspension of 10 g. of 16α,17α-oxido-6-methylpregnenolone (U.S. Patent 2,878,247) in 20 ml. of methylene chloride was cooled to 0° C. and thereupon treated with 17.2 ml. of ether containing 2.58 g. of hydrogen bromide for a period of 2 minutes. After 5 minutes a solid began to separate and after standing overnight at room temperature the solid was filtered off and washed with methylene chloride to give 10.58 g. (85.6%) of 16β-bromo-3β,17α-dihydroxy-6-methyl-5-pregnen-20-one. A second crop of 0.39 g. (3.2%) could be obtained by evaporating the mother liquors and triturating the thus-obtained solids with methylene chloride.

Recrystallization of the thus-obtained 16β-bromo-3β,17α-dihydroxy-6-methyl-5-pregnen-20-one from methanol and subsequently from ethyl acetate gave prisms of pure 16β-bromo-3,17α-dihydroxy-6-methyl-5-pregnen-20-one of melting point 207–210° C. with decomposition and rotation $[\alpha]_D$ —7° in dioxane and having an analysis as follows:

*Analysis.*—Calcd. for $C_{22}H_{33}O_3Br$: C, 62.11; H, 7.82; Br, 18.79. Found: C, 61.83; H, 7.65; Br, 18.71.

A suspension of 1 g. of finely powdered 16β-bromo-3β,17α-dihydroxy-6-methyl-5-pregnen-20-one in 20 ml. of methanol was treated with 3.5 g. of Raney nickel. The Raney nickel had previously been treated with a few drops of HBr in methanol, boiled and washed with methanol. The reaction mixture thus obtained was refluxed in a nitrogen atmosphere with agitation for 25 minutes. After cooling, needles which separated were redissolved by adding methylene chloride and the nickel removed by filtration and the filtrate concentrated to a small volume. To this methanol solution was added a little water whereupon needles separated weighing 0.47 g. and consisting of 16α-bromo-3β,17α-dihydroxy-6-methyl-5-pregnen-20-one. These needles were further purified by recrystallization from methylene chloride-methanol to give pure 16α-bromo-3β,17α-dihydroxy-6-methyl-5-pregnen-20-one of melting point 225–227° C. and rotation $[\alpha]_D$ —37° in both chloroform and dioxane. The analysis of this pure 16α-bromo-3β,17α-dihydroxy-6-methyl-5-pregnen-20-one was as follows:

*Analysis.*—Calcd. for $C_{22}H_{33}O_3Br$: C, 62.11; H, 7.82; Br, 18.79. Found: C, 62.20; H, 7.87; Br, 18.48.

PREPARATION 2

*16α-iodo-3β,17α-dihydroxy-6-methyl-5-pregnen-20-one*

A solution of 10 g. of 6-methyl-16α,17α-oxidopregnenolone in 100 ml. of dioxane, purified over anhydrous alumina, were stirred at room temperature (22–25° C.) while 20 ml. of 47% aqueous hydroiodic acid was added during 3 minutes. The mixture was thereupon stirred overnight in a nitrogen atmosphere. Thereafter 125 ml. of water was added slowly over a period of 30 minutes under continuous stirring and seeding. After a further 20 minutes, the solids which separated were filtered off and washed on the filter with water. These solids were dried in vacuo at 40° C. to give 12.6 g. of material melting at 172° C. Recrystallizing this material from ethyl acetate containing enough methanol to dissolve the starting material gave a first crop of 8.6 g. of 16β-iodo-3β,17α-dihydroxy-6-methyl-5-pregnen-20-one of melting point 179° C. with decomposition and a second crop of 1.2 g. of melting point 177° C. with decomposition.

Another recrystallization of this 16β-iodo-3β,17α-dihydroxy-6-methyl-5-pregnen-20-one from methylene dichloride and Skellysolve B hexanes gave pure 16β-iodo-3β,17α-dihydroxy-6-methyl-5-pregnen-20-one of melting point 185–186° C. with decomposition and having a rotation $[\alpha]_D$ —16° in chloroform. The analysis of this material is as follows:

*Analysis.*—Calcd. for $C_{22}H_{33}O_3I$: C, 55.93; H, 7.04; I, 26.87. Found: C, 55.68; H, 7.07; I, 27.05.

A mixture of 1 g. of 16β-iodo-3β,17α-dihydroxy-6-methyl-5-pregnen-20-one, 10 ml. of methanol and 3.3 g. of Raney nickel (previously boiled in methanol containing a few drops of 47% hydrogen iodide, decanted and washed with methanol) was refluxed for a period of 15 minutes, then cooled, diluted with methylene chloride and filtered. The filtrate was diluted with methanol, concentrated and further diluted with water giving a precipitate which was recrystallized from methylene chloride-Skellysolve B hexanes to give 0.4 g. of 16α-iodo-3β,17α-dihydroxy-6-methyl-5-pregnen-20-one of melting point 230–233° C., rotation $[\alpha]_D$ —41° in chloroform and having an analysis as follows:

*Analysis.*—Calcd. for $C_{22}H_{33}IO_3$: C, 55.93; H, 7.04; I, 26.87. Found: C, 55.58; H, 6.96; I, 26.79.

EXAMPLE 1

*16α-bromo-3β,17α-dihydroxy-6-methyl-5-pregnen-20-one 3,17-diacetate*

A suspension of 2.4 g. of 16α-bromo-3β,17α-dihydroxy-6-methyl-5-pregnen-20-one in 18 ml. of carbon tetrachloride and 6 ml. of acetic anhydride containing 30 mg. of 2,4-dinitrobenzenesulfonic acid was stirred at 25° C. A clear solution resulted after 15 minutes and the reaction mixture was allowed to stand an additional 5 hours at 25° C. A blue-green color developed during this time. Following addition of 125 ml. of saturated sodium bicarbonate solution in water, the carbon tetrachloride was evaporated at reduced pressure, leaving a precipitate, which was collected and washed with water. Crystallization from aqueous acetone gave 2.61 g. of slightly yellow crystals which were recrystallized from acetone-water to give pure 16α-bromo-3β,17α-dihydroxy-6-methyl-5-pregnen-20-one 3,17-diacetate of melting point 213–215° C. with decomposition and having an analysis as follows:

*Analysis.*—Calcd. for $C_{26}H_{37}BrO_5$ (509.48): C, 61.29; H, 7.32; Br, 15.69. Found: C, 61.12; H, 6.99; Br, 15.80.

Example 2

16α-iodo-3β,17α-dihydroxy-6-methyl-5-pregnen-20-one 3,17-diacetate

A reaction mixture was prepared containing 0.47 g. of 16α-iodo-3β,17α-dihydroxy-6-methyl-5-pregnen-20-one, 3 ml. of carbon tetrachloride, 1 ml. of acetic anhydride, and 7 mg. of 2,4-dinitrobenzenesulfonic acid. This mixture was allowed to stand for 5 hours at 25° C. during which time an intense blue coloration developed, which changed eventually to a light reddish brown color. To this reaction mixture was added 75 ml. of cold water, the mixture was stirred for 1 hour, and extracted with three 50-ml. portions of methylene chloride. The methylene chloride portions were combined, dried over anhydrous sodium sulfate and evaporated to give a foamy material which upon recrystallization from aqueous acetone (three times) gave pure 16α-iodo-3β,17α-dihydroxy-6-methyl-5-pregnen-20-one 3,17-diacetate of melting point 221–225° C. with decomposition, rotation $[\alpha]_D$ —69° in chloroform, and having an analysis as follows:

*Analysis.*—Calcd. for $C_{26}H_{37}IO_5$ (556.47): C, 56.11; H, 6.70; I, 22.1. Found: C, 56.19; H, 6.90; I, 22.75.

Example 3

16α-bromo-3β,17α-dihydroxy-6-methyl-5-pregnen-20-one 3,17-dibenzoate

In the same manner given in Example 1, 16α-bromo-3β,17α-dihydroxy-6-methyl-5-pregnen-20-one was reacted in carbon tetrachloride with benzoic acid anhydride in the presence of toluene-sulfonic acid at a temperature between 23 and 26° C. The material which was obtained by evaporation of the solvent was recrystallized repeatedly from acetone and water to give pure 16α-bromo-3β,17α-dihydroxy-6-methyl-5-pregnene-20-one 3,17-dibenzoate.

Example 4

16α-iodo-3β,17α-dihydroxy-6-methyl-5-pregnen-20-one 3,17-dipropionate

A solution was prepared containing 1 g. of 16α-iodo-3β,17α-dihydroxy-6-methyl-5-pregnen-20-one in 10 ml. of pyridine and 5 ml. of propionyl chloride. The mixture was allowed to stand at room temperature for a period of 18 hours, was thereupon poured into cold water and the thus-formed oily precipitate extracted with methylene dichloride. The methylene dichloride extracts were combined, washed with water, dried over anhydrous sodium sulfate, and evaporated and the thus-obtained residue three times recrystallized from aqueous methanol to give 16α-iodo-3β,17α-dihydroxy-6-methyl-5-pregnen-20-one 3,17-dipropionate.

16α-bromo- and 16α-iodo-3β,17α-dihydroxy-6-methyl-5-pregnen-20-ones can be esterified with anhydrides of organic carboxylic acids or with acyl chloride or bromides, the acyl groups of which are of organic carboxylic acid as defined hereinbefore, to give the corresponding 3,17-diacylates.

In this manner, treating a selected 16α-bromo- or 16α-iodo - 3β,17α-dihydroxy-6-methyl-5-pregnen-20-one, dissolved in carbon tetrachloride, in the presence of 2,4-dinitrobenzene-sulfonic acid:

(a) With butyric anhydride there was obtained 16α-bromo- or respectively 16α-iodo-3β,17α-dihydroxy-6-methyl-5-pregnen-20-one 3,17-butyrate;

(b) With valeric anhydride there was obtained 16α-bromo- or respectively 16α-iodo-3β,17α-dihydroxy-6-methyl-5-pregnen-20-one 3,17-divalerate;

(c) With hexanoic acid anhydride there was obtained 16α-bromo- or respectively 16α-iodo-3β,17α-dihydroxy-6-methyl-5-pregnen-20-one 3,17-dihexanoate;

(d) With octanoic acid anhydride there was obtained 16α-bromo- or respectively 16α-iodo-3β,17α-dihydroxy-6-methyl-5-pregnen-20-one 3,17-dioctanoate;

(e) With decanoic acid anhydride there was obtained 16α-bromo- or respectively 16α-iodo-3β,17α-dihydroxy-6-methyl-5-pregnen-20-one 3,17-didecanoate;

(f) With phenylpropionic anhydride there was obtained 16α-bromo- or respectively 16α-iodo-3β,17α-dihydroxy-6-methyl-5-pregnen-20-one 3,17-di-(phenylpropionate).

In the same manner given in Example 4, using an acyl halide in pyridine solution with 16α-bromo- or respectively 16α-iodo-3β,17α-dihydroxy-6-methyl-5-pregnen-20-one, results in the production of the corresponding 16α-bromo- or respectively 16α-iodo-3β,17α-dihydroxy-6-methyl-5-pregnen-20-one 3,17-diacylates. Thus, 16α-bromo- or respectively 16α-iodo-3β,17α-dihydroxy-6-methyl-5-pregnen-20-one was converted:

(a) With β-cyclopentylpropionyl chloride to 16α-bromo- or respectively 16α-iodo-3β,17α-dihydroxy-6-methyl-5-pregnen-20-one 3,17-di-(β-cyclopentylpropionate);

(b) With isobutyryl bromide to 16α-bromo- or respectively 16α-iodo-3β,17α-dihydroxy-6-methyl-5-pregnen-20-one 3,17-di(isobutyrate);

(c) With heptanoyl chloride to 16α-bromo- or respectively 16α-iodo-3β,17α-dihydroxy-6-methyl-5-pregnen-20-one 3,17-diheptanoate.

Example 5

16α-iodo-3β,17α-dihydroxy-6-methyl-5-pregnen-20-one 17-acetate

A solution of 1.6 g. of 16α-iodo-3β,17α-dihydroxy-6-methyl-5-pregnen-20-one 3,17-diacetate in 50 ml. of methanol containing 0.33 ml. of concentrated hydrochloric acid was heated under reflux for 1 hour and then cooled. To the cooled reaction mixture was added an excess of aqueous sodium bicarbonate solution, the mixture was then concentrated at reduced pressure, diluted with water and extracted with three 50 ml. portions of methylene chloride. The methylene chloride portions were combined, washed with water, dried over anhydrous sodium sulfate and evaporated to give 1.09 g. of material melting at 201–205° C. after one crystallization from acetone. This material was recrystallized to give pure 16α-iodo - 3β,17α - dihydroxy-6-methyl-5-pregnen-20-one 17-acetate of melting point 205–207° C. having the following analysis:

*Analysis.*—Calcd. for $C_{24}H_{35}IO_4$ (514.45): C, 56.03; H, 6.86; I, 24.67. Found: C, 55.97; H, 6.99; I, 23.75.

Example 6

16α-bromo-3β,17α-dihydroxy-6-methyl-5-pregnen-20-one 17-acetate

In the same manner as shown in Example 5, 2.6 g. of 16α - bromo - 3β,17α-dihydroxy-6-methyl-5-pregnen-20-one 3,17-diacetate was selectively solvolyzed in 75 ml. of methanol containing 0.5 ml. of concentrated hydrochloric acid. The mixture was boiled, cooled and the crude material extracted as in Example 5. The crude material was thereupon recrystallized from aqueous acetone to give 1.73 g. of 16α-bromo-3β,17α-dihydroxy-6-methyl-5-pregnen-20-one 17-acetate of melting point 202–206° C. and having an analysis as follows:

*Analysis.*—Calcd. for $C_{24}H_{35}BrO_4$ (467.46): C, 61.66; H, 7.55; Br, 17.10. Found: C, 61.37; H, 7.59; Br, 17.21.

Example 7

16α-bromo-3β,17α-dihydroxy-6-methyl-5-pregnen-20-one 17-benzoate

In the same manner given in Example 5 two grams of 16α - bromo-3β,17α-dihydroxy-6-methyl-5-pregnen-20-one 3,17-dibenzoate, dissolved in 60 ml. of methanol containing 0.3 ml. of concentrated sulfuric acid, were solvolyzed and the product obtained by extraction and recrystallized from aqueous methanol to give 16α-bromo-3β,17α-dihydroxy-6-methyl-5-pregnen-20-one 17-benzoate.

EXAMPLE 8

*16α-iodo-3β,17α-dihydroxy-6-methyl-5-pregnen-20-one 17-propionate*

In the same manner given in Example 5, two grams of 16α - iodo - 3β,17α-dihydroxy-6-methyl-5-pregnen-20-one 3,17-dipropionate in 60 ml. of methanol containing 0.4 ml. of concentrated hydrochloric acid were solvolyzed. The products were isolated by extraction with methylene chloride, and purified by recrystallization from aqueous acetone to give 16α-iodo-3β,17α-dihydroxy-6-methyl-5-pregnen-20-one 17-propionate.

In the same manner illustrated by Example 5, other diacylates of 16α-bromo- and 16α-iodo-3β,17α-dihydroxy-6-methyl-5-pregnene-3,20-dione can be selectively solvolyzed in an organic solvent such as methanol, ethanol, or the like, with hydrochloric acid, sulfuric acid, perchloric acid, hydrobromic acid, or toluenesulfonic acid catalysis to give the corresponding 17-monoacylates of 16-bromo- or respectively 16-iodo-3β,17α-dihydroxy-6-methyl-5-pregnene-3,20-dione. Representative 17-monoacylates thus obtained include the 17-propionate, -butyrate, -valerate, hexanoate, -heptanoate, -octanoate, -decanoate, -laurate, -benzoate, -phenylacetate, -phenylpropionate, -cyclopentylpropionate, -isobutyrate of 16α-bromo- or respectively 16α - iodo - 3β,17α - dihydroxy-6-methyl-5-pregnene-3,20-dione.

EXAMPLE 9

*16α-iodo-6α-methyl-17α-hydroxy-4-pregnene-3,20-dione 17-acetate*

A mixture was prepared containing 0.75 g. of 16α-iodo-3β,17α-dihydroxy-6-methyl-5-pregnen-20-one 17-acetate in 30 ml. of toluene containing 7 ml. of cyclohexanone and 0.35 g. of aluminum isopropoxide. This mixture was heated at reflux for 50 minutes then cooled, and thereto was added a 50% aqueous solution of Rochelle salt (50 ml.). The mixture was then diluted with toluene, the organic layer was separated and was washed with water, dried over anhydrous sodium sulfate and evaporated at reduced pressure to give an oil which was chromatographed over 100 g. of Florisil anhydrous magnesium silicate. Fractions were obtained by elution with mixtures of acetone-Skellysolve B hexanes, and the fractions consisting of 10 to 15% acetone, balance Skellysolve B hexanes, were combined and evaporated to give 0.55 g. of solid material which was rechromatographed over 100 g. of Florisil anhydrous magnesium silicate, using linear gradient elution (the solvent system consisted of 2 l. of 20% acetone–80% Skellysolve B and 2 l. of Skellysolve B hexanes). Fractions of 200 ml. were collected. Fractions 14–17 of these 200 ml. fractions were combined and evaporated to give 0.28 g. of material which was redissolved in 1:1 petroleum ether-benzene mixture and chromatographed over 12.5 g. of neutral, deactivated alumina (British 2). Elution with the same solvent mixture (petroleum ether-benzene) gave traces of oils and then further elution with benzene gave 0.19 g. of an oil which was crystallized from aqueous methanol to give 75 mg. of 16α-iodo - 17α - hydroxy-6α-methyl-4-pregnene-3,20-dione 17-acetate of melting point 176–179° C. with decomposition and having an analysis as follows:

*Analysis.*—Calcd. for $C_{24}H_{33}IO_4$ (512.41): C, 56.25; H, 6.49; I, 24.77. Found: C, 56.45; H, 6.39; I, 24.31.

EXAMPLE 10

*16α-bromo-6α-methyl-17α-hydroxy-4-pregnene-3,20-dione 17-acetate*

In the same manner given in Example 9, 16α-bromo-3β - 17α-dihydroxy-6-methyl-5-pregnen-20-one 17-acetate was oxidized with aluminum isopropoxide in a cyclohexanone-toluene solution at reflux temperature. The obtained product was thereupon isolated by chromatography with benzene and Skellysolve B hexanes and recrystallized from methanol to give 16α-bromo-6α-methyl-17α-hydroxy-4-pregnene-3,20-dione 17-acetate of melting point 176–183° C. and having the following analysis:

*Analysis.*—Calcd. for $C_{24}H_{33}BrO_4$ (465.45): C, 61.93; H, 7.15; Br, 17.17. Found: C, 62.16; H, 7.37; Br, 17.18.

In the same manner given in Example 9, other 17α-mono- acylates of 16α-bromo- and 16α-iodo-3β,17α-dihydroxy-6-methyl-5-pregnen-20-ones can be oxidized with Oppenauer oxidation using isopropoxide, tertiary butoxide, and the like, of aluminum in the presence of acetone, methyl-ethyl ketone, diethyl ketone, or preferably cyclohexanone in an organic solvent such as benzene, toluene, xylenes, or the like to give the corresponding 17-acylate of 16α-bromo- or respectively 16α-iodo-6-methyl-17α-hydroxyprogesterone. Representative compounds thus obtained and belonging to this class include the 17-propionate, 17-butyrate, 17-valerate, 17-hexanoate, 17-heptanoate, 17-octanoate, 17-decanoate, 17-laurate, 17-isobutyrate, 17 - benzoate, 17 - cyclopentylpropionate, 17-phenylacetate, 17-phenylpropionate, and the like of 16α-bromo- or respectively 16α-iodo-6α-methyl-17α-hydroxy-4-pregnene-3,20-diones.

The products of this invention can also be made according to the process illustrated below by the synthesis of 16α - bromo - 6α - methyl-17α-hydroxy-4-pregnene-3,20-dione 17-acetate in Example 11.

EXAMPLE 11

*16α-bromo-6α-methyl-17α-hydroxy-4-pregnene-3,20-dione acetate*

A solution of 3.77 g. of 16α,17α-oxido-6α-methyl-4-pregnene-3,20-dione in 60 ml. of acetic acid was treated with 4 ml. of 32% hydrogen bromide in acetic acid for ½ hour at 25° C. The mixture was diluted to 500 ml. with ice water to give 16β-bromo-17α-hydroxy-6α-methyl-4-pregnene-3,20-dione as a solid but gummy product which was collected and washed with water.

A 4 g. sample of the crude 16β-bromo-17α-hydroxy-6α-methyl-4-pregnene-3,20-dione in 160 ml. of methanol was refluxed for 1 hour with 2 g. of Raney nickel. The reaction mixture was then cooled and filtered. The filtrate was evaporated, redissolved in acetone and chromatographed over 250 g. of Florisil magnesium silicate using gradient elution consisting of acetone and Skellysolve B hexanes containing from 0% acetone to 30% acetone in Skellysolve B hexanes. Crystallization of a peak fraction of acetone-Skellysolve B hexanes and recrystallization from aqueous methanol gave 0.15 g. of 16α-bromo-17α-hydroxy - 6α-methyl - 4-pregnene-3,20-dione of melting point 184–202° C. and the following analysis:

*Analysis.*—Calcd. for $C_{22}H_{31}O_3Br$ (423.41): Br, 18.87. Found: Br, 18.19.

A suspension of 0.35 g. of 16α-bromo-6α-methyl-17α-hydroxy-4-pregnene-3,20-dione in 2.7 ml. of carbon tetrachloride and 0.9 ml. of acetic anhydride containing 5 mg. of 2,4-dinitrobenzenesulfonic acid was stirred briefly to dissolve. The mixture was then allowed to stand for 5 hours at 25° C. Thereafter 20 ml. of aqueous saturated sodium bicarbonate solution was added and thereupon methylene chloride. The organic layer which separated was washed with water, dried over anhydrous sodium sulfate, and evaporated to a foam. A solution of the foam in 13 ml. of methanol containing 0.09 ml. of concentrated hydrochloric acid was refluxed for 1 hour, then cooled, neutralized with sodium bicarbonate solution, diluted with water and extracted with methylene chloride. The organic extract was dried over anhydrous magnesium sulfate, concentrated to dryness, and chromatographed over 50 g. of Florisil magnesium silicate. The peak fraction eluted with 10–15% acetone in Skellysolve B hexanes was crystallized from aqueous acetone to give 175 mg. of 16α-bromo-6α-methyl-17α - hydroxy - 4 - pregnene-3,20-dione 17-acetate of melting point 176–183° C.

EXAMPLE 12

*16α-bromo-6-methyl-17α-hydroxy-4,6-pregnadiene-3,20-dione acetate*

A mixture of 1 g. of 16α-bromo-6α-methyl-17α-hydroxy-4-pregnene-3,20-dione acetate and 1 g. of chloranil in 100 ml. of t-amyl alcohol is stirred and heated to reflux for about 6 hours. (Completeness of the reaction was determined by testing the ultraviolet absorption at about 240 mμ. Disappearance of the absorption indicates the completeness of the reaction.) The reaction mixture was then cooled and filtered and the filtrate evaporated in vacuo. The residue was partitioned between methylene chloride and water; the methylene chloride layer was then separated, washed with water, dried over anhydrous magnesium sulfate and evaporated until a solid residue was obtained. This residue was crystallized three times from aqueous methanol to give pure 16α-bromo-6-methyl-17α-hydroxy-4,6-pregnadiene-3,20-dione acetate.

In the same manner given in Example 12, reacting 16α-iodo-6α-methyl-17α-hydroxy-4-pregnene-3,20 - dione acetate with chloranil in t-amyl alcohol gave 16α-iodo-6-methyl-17α-hydroxy-4,6-pregnadiene-3,20 - dione 17 - acetate.

Reacting in the manner disclosed in Example 12 other hydrocarbon carboxylic acid esters of 16α-bromo- and 16α-iodo-6α-methyl-17α-hydroxy-4-pregnene-3,20 - dione with chloranil in t-amyl alcohol gave the corresponding 17-acylates of 16α-bromo- and 16α-iodo-6-methyl-17α-hydroxy-4,6-pregnadiene-3,20-dione. Representative esters thus obtained include the 17-propionate, 17-butyrate, 17-valerate, 17-hexanoate, 17 - heptanoate, 17 - octanoate, 17-decanoate, 17-laurate, 17-o-ethylbenzoate, 17-p-ethylbenzoate, 17 - phenylacetate, 17-phenylpropionate, 17-cyclopentylpropionate, and the like, of 16α-bromo-6-methyl-17α-hydroxy-4,6-pregnadiene-3,20-dione and 16α-iodo-6-methyl-17α-hydroxy-4,6-pregnadiene-3,20-dione.

Submitting to fermentation by *Cunninghamella blakesleena* or *Curvularia lunata* 16α-bromo- and 16α-iodo-6-methyl-17α-hydroxy-4,6-pregnadiene-3,20-dione 17-acylates results in the 17-acylates of 16α-bromo- and 16α-iodo-6-methyl-11β,17α-dihydroxy - 4,6 - pregnadiene-3,20 - diones. Treatment of these compounds with calcium oxide and iodine, and subsequently with potassium acetate gave 16α-bromo- and 16α-iodo-6-methyl-11β,17α,21-trihydroxy-4,6-pregnadiene-3,20-dione 17,21-diacylates, which can be hydrolyzed with sodium bicarbonate in methanol in a nitrogen atmosphere to give the free alcohols, 16α-bromo-11β,17α,21-trihydroxy-4,6-pregnadiene - 3,20 - dione and 16α-iodo-11β,17α,21-trihydroxy - 4,6 - pregnadiene - 3,20-dione, having high anti-inflammatory activity.

I claim:

1. A 16α-halo-6α-methyl-17α-acyloxy - 4 - pregnene of the formula:

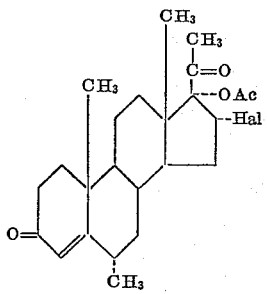

wherein Ac is the acyl radical of a hydrocarbon carboxylic acid containing from 1 to 12 carbon atoms and wherein Hal is a halogen atom selected from the group consisting of bromine and iodine.

2. 16α-bromo-6α-methyl - 17α - hydroxy-4 - pregnene-3,20-dione 17-acetate.

3. 16α-iodo-6α-methyl-17α-hydroxy-4-pregnene - 3,20-dione 17-acetate.

4. A 16α-halo-6-methyl-17α-acyloxy-4,6 - pregnadiene of the formula:

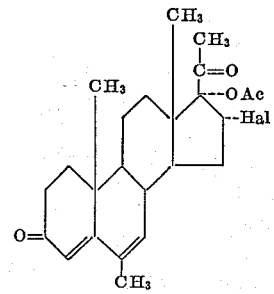

wherein Ac is the acyl radical of a hydrocarbon carboxylic acid containing from 1 to 12 carbon atoms and wherein Hal is a halogen atom selected from the group consisting of bromine and iodine.

5. 16α-bromo-6-methyl-17α-hydroxy-4,6 - pregnadiene-3,20-dione 17-acetate.

6. 16α-iodo-6-methyl-17α - hydroxy - 4,6 - pregnadiene-3,20-dione 17-acetate.

7. 16α-halo-3β,17α-dihydroxy-6 - methyl - 5 - pregnen-20-one, wherein the halogen is selected from the group consisting of bromine and iodine.

8. 16α-bromo-3β,17α-dihydroxy-6-methyl - 5 - pregnen-20-one.

9. 16α-iodo-3β,17α-dihydroxy-6 - methyl - 5 - pregnen-20-one.

10. 16α-halo-3β,17α-dihydroxy-6 - methyl - 5 - pregnen-20-one 3β,17α-diacylates of the formula:

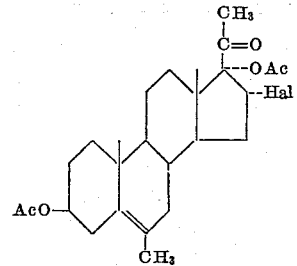

wherein Hal is a halogen atom selected from the group consisting of bromine and iodine and Ac is the acyl radical of a hydrocarbon carboxylic acid containing from 1 to 12 carbon atoms, inclusive.

11. 16α - bromo - 3β,17α - dihydroxy - 6 - methyl-5-pregnen-20-one 3β,17α-diacetate.

12. 16α - iodo - 3β,17α - dihydroxy - 6 - methyl - 5 - pregnen-20-one 3β,17α-diacetate.

13. 16α - halo - 3β,17α - dihydroxy - 6 - methyl - 5-pregnen-20-one 17α-acylates of the formula:

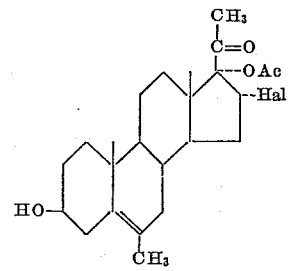

wherein Hal is a halogen atom selected from the group consisting of bromine and iodine and Ac is the acyl radical of a hydrocarbon carboxylic acid containing from 1 to 12 carbon atoms, inclusive.

14. 16α - bromo - 3β,17α - dihydroxy - 6 - methyl - 5-pregnen-20-one 17α-acetate.

15. 16α - iodo - 3β,17α-dihydroxy-6-methyl-5-pregnen-20-one 17α-acetate.

16. A process for the production of a 16α-halo-6α-methyl-17α-acyloxypregnane of the formula:

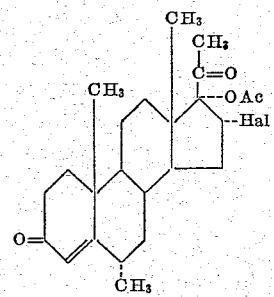

wherein Ac is the acyl radical of an organic carboxylic acid containing from 1 to 12 carbon atoms and wherein Hal is a halogen atom selected from the group consisting of bromine and iodine which comprises: treating a 16α-halo-3β,17α-dihydroxy-6-methyl-5 - pregnen - 20 - one, wherein the halogen atom is defined as above, with an acylating agent selected from the group consisting of acyl bromides, acyl chlorides and organic carboxylic acid anhydrides, wherein the acyl group and the organic carboxylic acid are defined as hereinbefore, to obtain the corresponding 16α-halo-3β,17α-diacycloxy - 6 - methyl - 5-pregnen-20-one, wherein acyl and the halogen is defined as above; selectively solvolyzing this diacylate with an alkanol having from 1 to 4 carbon atoms, inclusive, in the presence of a strong acid to obtain the corresponding 17-monoacylate and oxidizing the resulting 17-monoacylate with a reagent selected from the group consisting of aluminum isopropoxide and aluminum tertiary butoxide in the presence of a ketone to obtain the corresponding 16α-halo-6α-methyl-17α-hydroxy - 4 - pregnene - 3,20-dione 17-acylate.

17. A process for the production of 16α-bromo-6α-methyl - 17α - hydroxy - 4 - pregnene - 3,20 - dione 17-acetate, which comprises: treating 16α - bromo - 3β, 17α - dihydroxy - 6 - methyl - 5 - pregnen - 20 - one with acetic anhydride to obtain 16α-bromo-3β,17α-dihydroxy-6-methyl-5-pregnen-20-one 3,17-diacetate; selectively solvolyzing the obtained 3,17-diacetate in methanol with hydrochloric acid to obtain 16α-bromo-3β,17α-dihydroxy-6-methyl-5-pregnen-20-one 17-acetate and oxidizing the 3-hydroxyl with aluminum isopropoxide and a ketone to obtain 16α-bromo-6α-methyl - 17α - hydroxy - 4 - pregnene-3,20-dione 17-acetate.

18. A process for the production of 16α-iodo-6α-methyl-17α-hydroxy-4-pregnene-3,20-dione 17-acetate which comprises: treating 16α-iodo-3β,17α-dihydroxy - 6 - methyl-5-pregnen-20-one with acetic anhydride to obtain 16α-iodo-3β,17α-dihydroxy-6-methyl-5-pregnen-20-one 3,17 - diacetate; selectively solvolyzing the obtained 3,17-diacetate in methanol with hydrochloric acid to obtain 16α-iodo-3β,17α-dihydroxy-6-methyl-5-pregnen-20-one 17-acetate and oxidizing the 3-hydroxyl with aluminum isopropoxide and a ketone to obtain 16α - iodo - 6α-methyl-17α-hydroxy-4-pregnen-3,20-dione 17-acetate.

References Cited by the Examiner

Syhora: "Coll. Czech. Chem. Comm.," vol. 26, April 1961, pp. 1026–1033.

Syhora: "Coll. Czech. Chem. Comm.," vol. 28, March 1963, pp. 637–643.

LEWIS GOTTS, *Primary Examiner.*